Patented Oct. 21, 1930

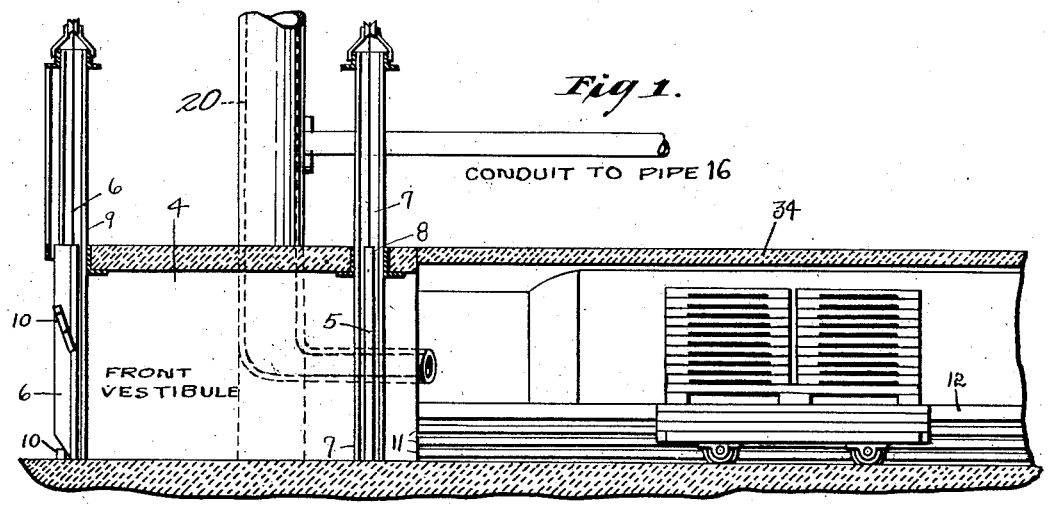
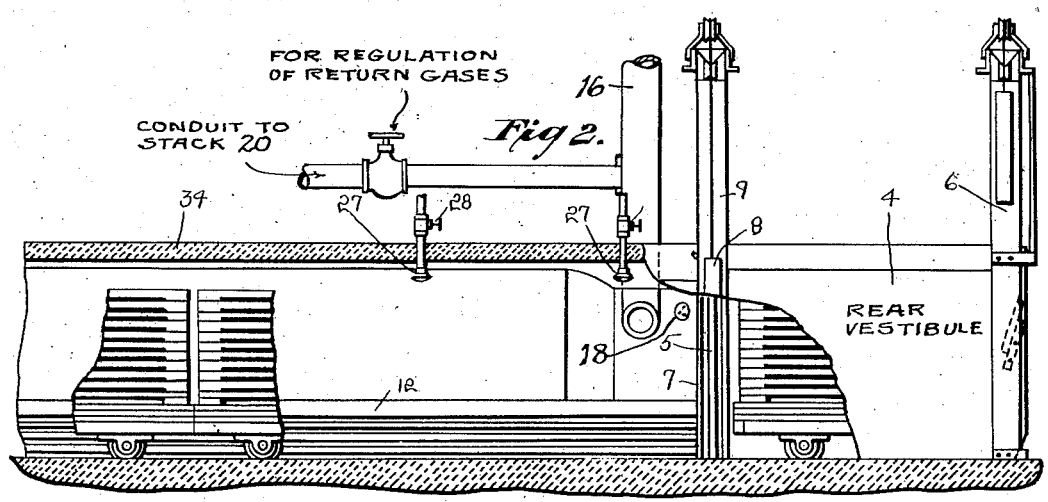

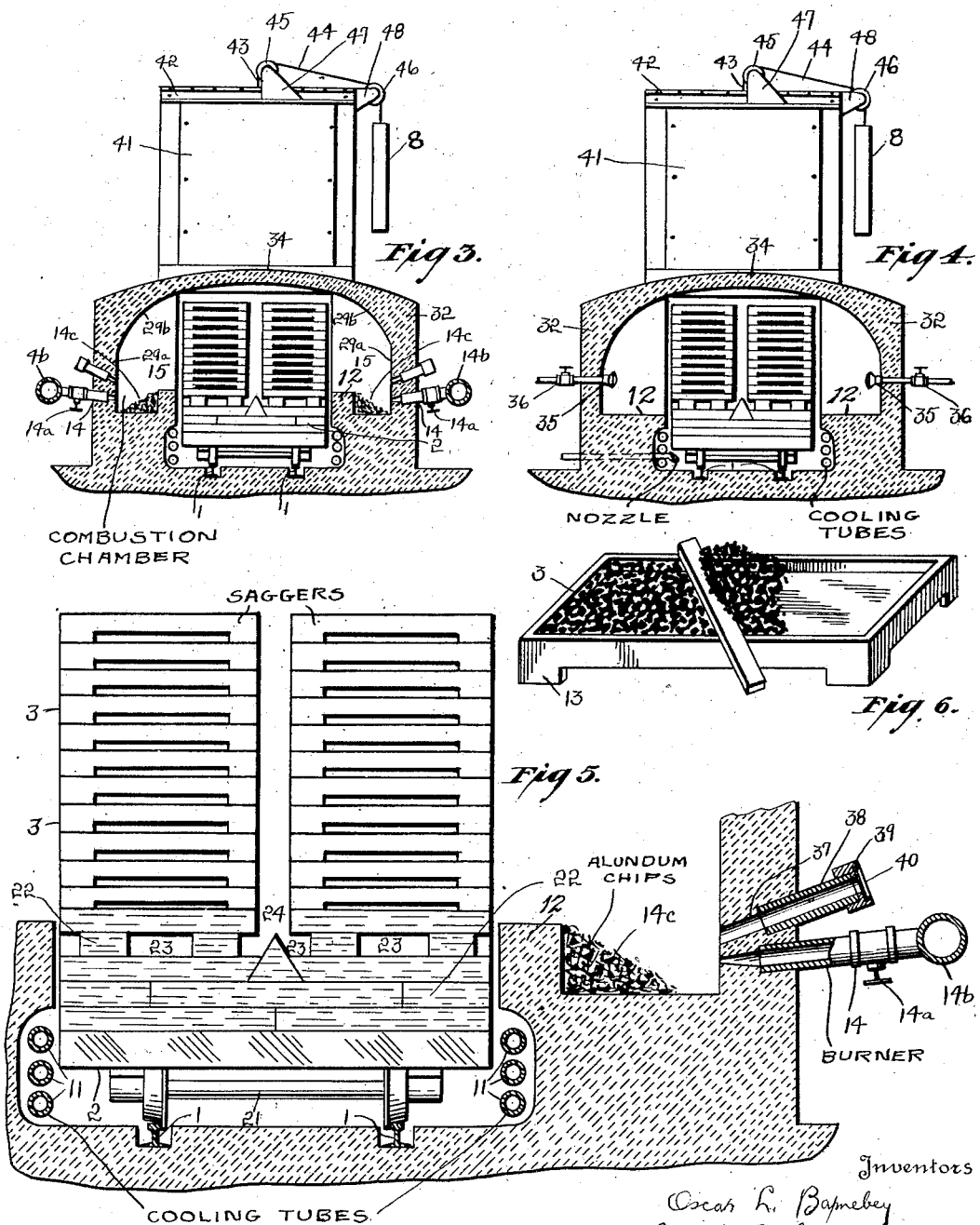

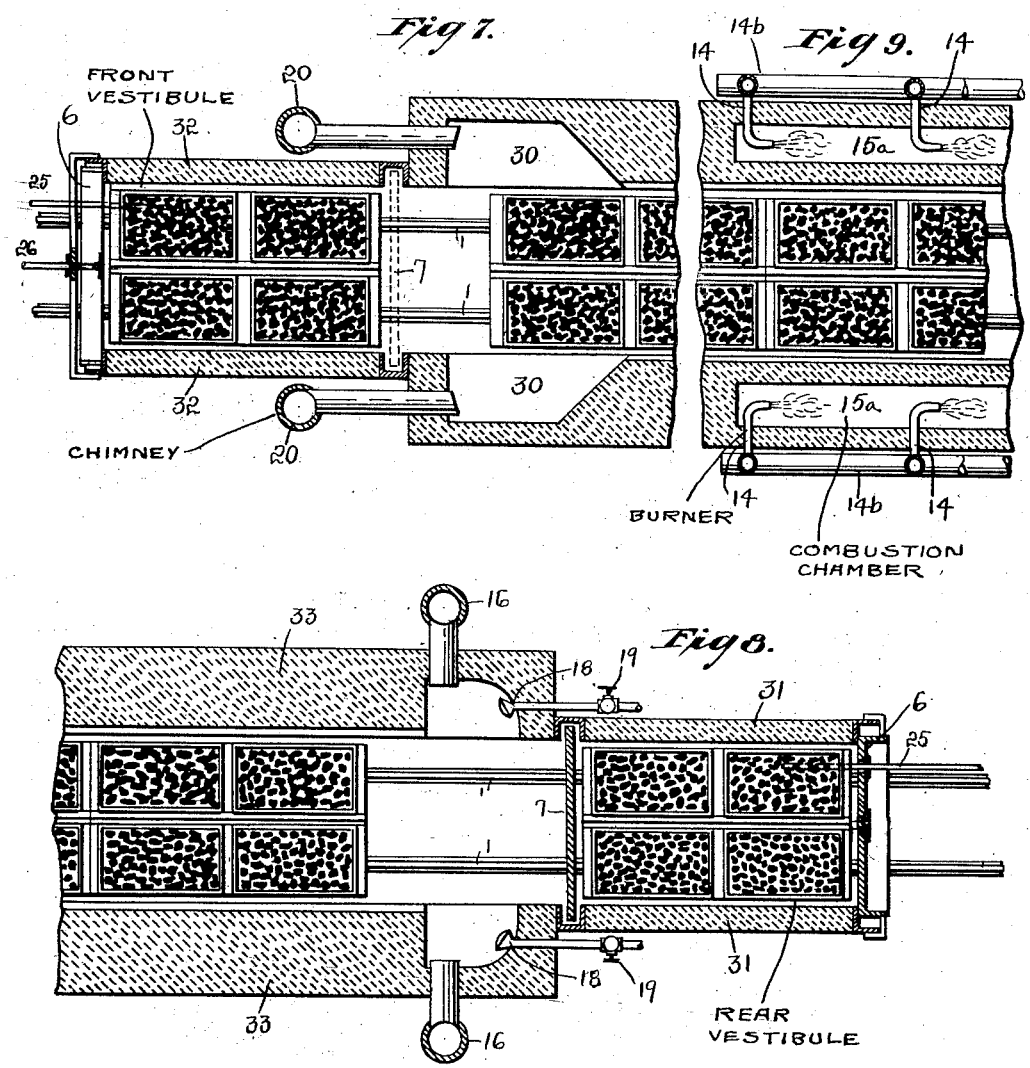

1,778,747

UNITED STATES PATENT OFFICE

OSCAR L. BARNEBEY, OF COLUMBUS, AND MERRITT B. CHENEY, DECEASED, LATE OF BRIGGSDALE, OHIO, BY JOSEPHINE B. CHENEY, ADMINISTRATRIX, OF BRIGGSDALE, OHIO

TUNNEL KILN

Application filed February 21, 1925. Serial No. 10,925.

This application is in part a division of our application, Ser. No. 283,639, filed March 19, 1919, which has issued into U. S. Patent No. 1,541,099.

This invention relates to an apparatus for carrying out chemical reactions at high temperature and other treatments of material at elevated temperatures. The invention has special reference to an apparatus for the activation of carbon and carbonaceous material.

Heretofore carbon has been activated by treatment with steam in vertical tubes made of nichrome alloy, such tubes being about seven inches in diameter and heated externally. Steam is introduced into the charcoal in this tube through an inner tube at the temperature of operation, approximately 900° C. Reaction of the steam on the charcoal produces what is known as "activated charcoal." Other furnaces, such as require the use of a revolving tube or the use of an inclined hearth have been proposed for steam activation.

The vertical seven inch treater has a very limited capacity and to utilize the capacity which it possesses requires the conduction of heat through the carbon, which is highly insulating in character, to a depth too great to be practicable. This treater has a serious disadvantage of having the essential parts made of metal which deteriorates rather rapidly. The use of the revolving tube which is also made of metal introduces the same objections as the vertical treater when the tube is filled with any considerable depth of material and unless it is thus filled the output of such a tube is so small that it becomes impracticable. Furthermore, such a revolving furnace has the disadvantage of having a very deep layer for the activating gases to penetrate within the practical depths at which it must be operated. Inclined hearth furnaces have the disadvantage of requiring the layers of carbon on the hearth to be uneven in thickness and further are difficult to regulate. Although inclined furnaces of this type have been proposed they have not been reduced to practice.

In the three furnaces mentioned above the movement of the carbon in the process produces more or less abrasive effect on the carbon during activation, thus exerting a grinding effect on the charcoal and producing an excessive quantity of fines which in certain cases is objectionable.

Among the objects of this invention is to provide an apparatus whereby carbon or other material may be treated at high temperatures with reactive as well as non-reactive gases. A further object of this invention is to provide an apparatus whereby large quantities of carbon or other material may be given a high temperature treatment and whereby the process may be effectively carried out in a comparatively short time. A still further object of this invention is to provide an apparatus whereby the temperatures at all stages of the device may be closely controlled and regulated and, more particularly, permit a gradual gradient of temperature from each end of the device toward the central portion having the highest temperature.

More specifically, it is an object of this invention to provide an apparatus whereby carbon or carbonaceous material may be treated with oxygenated gases at temperatures up to 1300° C., and whereby these heated oxygenated gases are allowed to penetrate and come in contact with all portions of the masses of carbon or carbonaceous material undergoing treatment.

Other further and more specific objects of the invention will become readily apparent to persons skilled in the art from a consideration of the following description when taken in conjunction with the drawings, wherein:—

Fig. 1 is a longitudinal cross-section of a portion of the device embodying the front end of a kiln.

Fig. 2 is a side elevation of another portion of the device embodying the rear end of the kiln, a portion of the device being broken away to illustrate the interior thereof.

Fig. 3 is a transverse cross-section through the kiln in the region of the burners.

Fig. 4 is a transverse cross-section through the kiln in the region of the side water sprays.

Fig. 5 is a fragmental view partly in section showing a carrier with stacks of saggers or trays in the interior of the kiln.

Fig. 6 is a perspective view showing one of our preferred forms of trays, preferably made of ceramic material, and containing the carbon or charcoal to be treated in the kiln.

Figs. 7 and 8 are horizontal cross-sectional views taken at the front and rear ends, respectively, of the kiln.

Fig. 9 is a horizontal cross-sectional view of a portion of the kiln intermediate between the ends and taken in the region of the burners, and illustrating a modified form of heating arrangement.

The apparatus comprises a kiln having a long tunnel and provided with a pair of rails (1) for conveying cars (2) carrying stacks of saggers (3) for receiving the material to be activated. At each end of the tunnel is a vestibule (4) provided with an inner door (5) and an outer door (6). The inner door (5) is preferably constructed of asbestos with suitable metal braces and supports and moves vertically in guide-ways (7) which are made gas-tight by suitable metal casings. A counter weight (8) is arranged in the manner shown, and assists in raising and lowering the door (5). The outer door (6) is similarly constructed and disposed and moves in guide-ways (9). In order to secure a gas-tight closure for the outer door, so as to prevent gases from escaping from or entering the tunnel, a pair of wedges (10) are arranged at the sides of this door and another pair at the lower corners. The guide-ways are provided with inclined abutments for receiving these wedges, so that when the door is lowered it automatically fits itself securely against the framework.

Throughout its entire length the tunnel is divided horizontally into an upper and lower compartment. The upper compartment contains the stacks of saggers with charcoal and through it the hot gases are passed for activation. The lower compartment contains cooling tubes (11) through which air or water may be passed in order to keep the metal parts of the trucks cool. If the air is not sufficient for this cooling purpose, additional water pipes may be supplied for furnishing cooling media for the lower truck frames. After the air or water leaves these tubes it may be passed into the combustion chamber or into the front end of the tunnel for direct treatment of the carbon or charcoal. Between these two compartments are arranged a pair of projecting ledges (12), which make close contact with the sides of the cars so that when the tunnel is entirely filled with cars there will be very little communication between the upper and the lower compartments. This is necessary in order to keep the two compartments at widely different temperatures.

The air and fuel are introduced by means of burners (14) located at the central portion of the furnace. The air-fuel mixture is conducted to the burners by the manifolds (14$^b$), the individual burners being regulated by valves (14$^a$). Combustion preferably occurs in a pair of combustion chambers (15) arranged along the sides of the furnace, but modifications thereof, for example as shown in Fig. 9 where the combustion occurs in separate chambers (15$^a$) which are walled away from the inner zone, may also be used. In this latter construction the gases heat the walls, which communicate the heat to the inner zone.

The gases pass from the combustion chambers through the upper compartment of the furnace and are first removed through a stack, and if desired may be caused to reenter the kiln through pipe (16). At the point where the hot gases reenter the kiln they are mixed with jets of water, steam or carbon dioxide issuing from the nozzles (18), which are controlled by the valves (19). These nozzles are directed into the heated furnace gases so as to insure immediate vaporization of the water when water in the liquid phase is employed. In using a burner system, such as illustrated in Fig. 3, it is not necessary to add combustion gases through pipe (16), but the atomized water or steam is added in this case through the nozzles (18). After passing through the tunnel from the car exit to the car intake end, the gases are led out by way of chimneys (20).

The car for carrying the trays with the material consists of a metal truck (21), and a fire-brick super-structure (22), near the upper portion of which a number of gas passages (23) are provided which open into a central longitudinal opening (24). The trays are arranged in vertical stacks superimposed upon and slightly spaced from each other so as to permit circulation of gases on all sides and laterally therethrough. The position of the car in the vestibule may be controlled by a hooked rod (25) which may be passed through an opening in the outer door (6). A power-operated pusher bar (26) is also provided for gradually moving the cars through the kiln.

The saggers (3) are provided with projecting corners (13), which form spaces between the individual saggers for allowing thorough circulation of the gases.

In the neighborhood of the cooling tubes (11) and near the front end of the tunnel there may be provided nozzles for introducing water, steam or carbon dioxide. The ends of these nozzles are directed upwards in order to promote circulation of the gases. Additional nozzles (27) with valves (28) are provided at the exit end of the kiln and also at intermediate points thereof so that water or gas may be introduced wherever and in whatever position desired. At the car exit end of the kiln the water or steam cools the cars and material carried therein, thus preparing same for exit from the kiln.

The burners (14) which may be fed with either solid, liquid or gaseous fuel are directed inward and downward against beds of alundum chips (14$^c$) which are arranged between the outer furnace walls and the tunnel. The inner wall of the tunnel comprises the vertical walls (29$^a$) and the curved or sloped continuations (29$^b$) extending from the vertical walls (29$^a$). These walls and continuations serve to direct the products of combustion from the combustion chambers (15) into and through the layers or masses of material in the saggers (3) and thus promote uniform heating of the stacks of saggers from the bottom to top.

At the extreme front end of the tunnel are provided two chambers (30), one at each side of the tunnel, for receiving the exit gases. From these chambers the exit gases may be discharged to any other desired place.

The walls (31) and (32) of the end compartments are preferably of fire-brick material and constructed so as to be substantially air-tight and fit snugly into the door jambs of doors (6 and 7) which connect the intake and exit chambers to the interior of the furnace and close the ends of the furnace to atmospheric air. The inside of the walls (33) of the main portion of the furnace are constructed of high grade fire-brick and the crown (34) of the furnace is constructed of fire-brick.

Water or steam sprays (35) controlled by valves (36), (illustrated in Fig. 4), are used in any part of the furnace which tends to develop local hot spots, so that the temperature at such portions may be reduced to that required. These water atomizers or injectors also serve to supply the desired quantity of water vapors at any point in the conduction of the process.

The port (37) serves as an entrance to the beds of alundum chips (14$^c$). The pipe (38) connects to port (37) and is provided with a cap (39) having a portion (40) of glass or isinglass, thus affording a vision directly into the furnace while avoiding the entrance of air. These fittings also provide a means for lighting the furnace, which can be done by removing the cap (39) and inserting a lighter. Upon opening the valve (14$^a$) the air-fuel mixture will enter the furnace and be lighted and burn on the beds of alundum chips (14$^c$) after which the lighter is withdrawn and the cap (39) screwed into place.

It is to be understood that in this specific embodiment as well as in the modifications thereof falling within the scope of this invention that suitable provisions may be made for receiving pyrometers, manometers and other gas testers, such as are present on furnaces, these forming no part of the present invention.

The exterior housing for the doors (6) and (7), illustrated in Figs. 3 and 4 comprises the casing (41) above which is a heavy supporting member (42), such as an angle iron or channel, which carries the pulley support (47) for the pulley (45). Another pulley support (48) for pulley (46) is also attached to the housing as indicated. Wire rope (44) passes through the opening (43) at the top of the casing and then over the two pulleys (45) and (46) and supports the dead weight (8) at one end and connects with the doors (6) or (7) at the other. This facilitates the raising and lowering of the door within the furnace. The framework and exterior housing are made of heavy metal riveted or bolted securely together, thus making the entire enclosure air-tight except where the rope (44) passes through opening (43), and a stuffing box may be used at the opening (43) if desired.

Ordinarily, the length of tunnel is 200 to 400 feet which provides for a preliminary heating zone of 50 to 100 feet, an activating zone of 80 to 150 feet and a cooling zone of 70 to 150 feet. A width of 8 to 15 feet and a height of 7 to 12 feet will satisfy the ordinary needs for carbon activation. The trucks should preferably be of such dimensions that at least one may be conveniently placed in the front and rear vestibules when stacked with saggers as illustrated in the drawings and also reach close to the sides of the projecting ledges (12) of the tunnel.

In carrying out a process, for example the activation of charcoal or carbon, with this apparatus, the proportions of heating and activating gases used may be varied through a considerable range. If carbon dioxide is to be used, the cheapest source of supply is the combustion gases resulting from operating the furnace. In using water for activation or cooling it may be introduced into the furnace by either atomizing or spraying, as water or as steam or super-heated stem.

Advantages may be derived from using a recuperative system at either or both ends of the furnace. Counter-current movement of gases and cars gives recuperation. By injecting water or steam so as to reach the material undergoing treatment before exit from the furnace, the material and containers will be cooled before leaving the kiln. By adding water in this matter, a much more uniform temperature gradient can be obtained throughout the reactive region of the furnace.

Combinations of the effects heretofore described may be used to advantage. For instance, the combustion gases may be vented into the reaction chamber and passed therethrough in a direction substantially parallel to that of the moving cars or furnace bottom, thus accomplishing two desirable results; that is, heating the cars and furnishing carbon dioxide and steam (if hydrocarbons are burned as fuel) for activation. If the furnace is very long, the gases from the combustion chamber may be too cool to heat up the cars as they enter, but may be used to cool the cars at the exit end of the furnace and to furnish carbon dioxide or steam for activation, or either of these objects may be accomplished.

The heat may be produced by combustion of solid fuel, such as coal, either lump or powdered; by combustion of liquid fuel such as oil, continuously supplied as a stream of liquid, sprayed or atomized; or by the burning of gaseous fuel such as natural gas, water gas, producer gas, etc. The fuel may be hand or machinery stoked, injected by air blast, or supplied in any other convenient manner. It may be added to the furnace through one or more intakes or burners. A long continuous combustion chamber or a series of shorter chambers may be used for burning the fuel in supplying the heat. Connections may be made directly from the combustion chamber to the reaction chamber so that the reaction gases may in whole or in part move directly into the reaction chamber. In fact, there need not necessarily be separate combustion and reaction chambers in the furnace as shown in Figs. 3 and 9. A wall may only partially separate the two in such a manner as to give for all intents and purposes a uniform reaction furnace in which occurs the combustion of the fuel and the treatment of the material with reactive gas. The wall, if necessary, can be completely removed and still the installation be so adjusted that the reactive gas can be heated to the proper temperature for activation. Especially is this true with the use of surface or flameless combustion.

Our arrangement of layers of material in multiple stacks with intervening spaces between the layers has many advantages over the use of a single layer. In fact, without this feature this invention would ordinarily have diminished or little value. By this construction the flow of gases in horizontal direction is split into a multitude of horizontal gas streams which give rapid heat transfer, rapid exchange of oxygenated gases to and from the material and further forces the gases to the material through the narrow passages formed between the layers. This is very difficult to accomplish in a single layer. Still further, the multiple layers make possible a large production output from the furnace, which is not possible with a single layer process.

The layers of carbon are preferably from ¾ to 2 inches in depth, although layers 3 inches deep may be employed. As the depth of these layers increases above ¾ inch the length of time required for the treatment is proportionately increased and when this depth is greater than three inches the quality of the product is inferior and a much longer time is required to produce carbon of even medium activity. Where the term "thin" is employed, it is intended to cover layers of this character, not exceeding three inches in thickness.

The carbonaceous material in the layers is ordinarily in granular form. To obtain this granulation, the material is usually pulverized and then screened to 8-14 mesh. The layers of material are moved or conducted through the furnace upon the carriers, and the carbon is thus moved en masse and remains in a quiescent condition throughout the treatment; that is, the granules within a layer are substantially without intermotion, thus avoiding the rubbing and grinding effects incident to the operation by means of the prior types of furnaces heretofore described. It is preferable to have the layers of uniform thickness and spaced from each other a distance of ¼-1 inch. Greater separation of the layers is to be avoided due to wastage of the kiln space and reduction in capacity of the furnace. The thin layers not only allow the reactive gas to penetrate therethrough but also promote uniform heating of the mass and permit ready escape of the gaseous reaction products.

The ceramic saggers are stacked in multiple series on cars which are moved through the furnace in such a manner as to leave space between the sides and ends of the saggers as well as between the saggers superimposed on each other in order to allow thorough circulation of the reactive gases.

The material employed in this apparatus for producing activated carbon is "carbonaceous material" by which term it is intended to include charcoal, anthracite coal, bituminous coal, wood, vegetable nuts, lamp black, bone black, oil shale and other carbon containing materials, both natural and artificial.

The time of activating the material varies with the nature of source of the material being treated, i. e., cocoanut carbon may require two hours at 875° or ten hours at 800° C. Natural coal may require five hours at 875° C. or twenty hours at 800° C. operating with ¾ inch layers of granular material. With deeper layers of material, longer periods of time are required to accomplish the same results. The time of reaction is sufficiently prolonged to obtain the maximum activation without undue losses of material.

The equipment can be operated at any temperature desired. Using our system of distributing burners along the sides of the furnace any temperature can be maintained at any particular position of furnace length.

Further our system of cooling accomplishes the cooling in a much shorter length of furnace than any other furnace of the movable bottom type, thus greatly lowering the cost of construction and giving greater capacity per unit of furnace length. The control of furnace conditions is made much better than previous furnaces of this type by the special method of burner arrangement and by our methods of cooling.

The entire operation is performed with the gases under only such pressures as are normally produced in the particular furnaces by the injection of the combustion gases and steam and the regulation of flue conditions of the furnace. No special attempt is made to produce abnormal pressures or evacuation. But it is preferable to have the furnace under slight positive pressure in order to insure a uniform gas atmosphere existing throughout the furnace. The manner of using the apparatus may be varied widely, depending upon the conditions of temperature, pressure, composition of reactive gases, and material within the furnace.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. A tunnel kiln comprising a lower compartment having cooling means and an upper compartment having entrances through the side for delivering into the kiln at the central portion and at points intermediate the central portion and each end of the kiln heating and reacting gases and producing gradual gradient of temperature from each end of the kiln to the central portion of highest temperature, said lower compartment being provided with a track for supporting and guiding a movable carrier through the kiln, a separating member for effecting substantial separation of the upper heating compartment from the lower cooling compartment when the tunnel is filled with carriers and means for atomizing water into the exit end of the upper compartment of said kiln.

2. A tunnel kiln comprising a lower compartment having cooling means and an upper compartment having entrances through the side thereof for delivering into the kiln at the central portion and at points intermediate the central portion and each end of the kiln heating, reacting and cooling gases and producing gradual gradient of temperature from each end of the kiln to the central portion of highest temperature, a separating member for effecting substantial separation of the upper heating compartment from the lower cooling compartment when the tunnel is filled with carriers and means for regulating the return to the kiln of the gases exiting therefrom.

3. A tunnel kiln comprising a lower compartment having cooling means, and an upper compartment having adjustable supplies of heating, cooling and reactive fluid distributed therein at the central portion and at points intermediate the central portion and each end of the kiln for positively regulating and controlling the temperature and the reaction at each stage of the kiln and producing gradual gradient of temperature from each end of the kiln to the central portion of highest temperature, means for atomizing water into the exit end of the upper compartment of said kiln and means for regulating the return to the kiln of the gases exiting therefrom.

4. In an apparatus for effecting chemical reactions at high temperature, a long tunnel kiln comprising an upper compartment having heating means at the central portion and at points intermediate the central portion and each end of the kiln for producing gradual gradient of temperature from each end of the kiln to the central portion of highest temperature and means for delivering reacting gases, and a lower compartment having cooling means, means for atomizing water into the exit end of the upper compartment of said kiln, a carrier having a plurality of superimposed trays for holding the material to be treated, said superimposed trays forming an open-work structure permitting free circulation of activating gas between same, means comprising rollers supporting said carrier for effecting smooth travel of said carrier through the kiln, and a separating member for effecting substantial separation of the upper heating compartment from the lower cooling compartment when the tunnel is filled with carriers.

5. In an apparatus for activating carbon, a tunnel kiln having a preliminary heating zone leading from one end of the kiln to an activation zone in the intermediate portion of the kiln and a cooling zone leading from the intermediate portion of the kiln to the other end of said kiln and adjustable supplies of heating, cooling and activating fluid distributed throughout said kiln at the central portion and at points intermediate the central portion and each end of the kiln for regulating and controlling the temperature and activation of the carbon within said kiln and producing gradual gradient of temperature from each end of the kiln to the central portion of highest temperature, and means for atomizing water into the exit end of the upper compartment of said kiln.

6. In an apparatus for activating carbon, a tunnel kiln having a preliminary heating zone leading from one end of the kiln to an activation zone in the intermediate portion of the kiln and a cooling zone leading from the intermediate portion of the kiln to the other end of said kiln, adjustable supplies of heating, cooling and activating fluid distributed throughout said kiln at the central portion and at points intermediate the central portion and each end of the kiln for regulating and controlling the temperature and activation of the carbon within said kiln and producing gradual gradient of temperature from each end of the kiln to the central portion of highest temperature, and means for regulating the return to the kiln of the gases exiting therefrom.

7. In an apparatus for activating carbon, a tunnel kiln having means for producing gradual gradient of temperature from each end of the kiln to the central portion of highest temperature, said means comprising a preliminary heating zone leading from one end of the kiln to an activation zone in the intermediate portion of the kiln, a cooling zone leading from the intermediate portion of the kiln to the other end of said kiln and adjustable supplies of heating, cooling and activating fluid distributed throughout said kiln at the central portion and at points intermediate the central portion and each end of the kiln for regulating and controlling the temperature and activation of the carbon within said kiln, means for atomizing water into the exit end of the upper compartment of said kiln, and a substantially air-tight vestibule adjacent to an end of said kiln and adapted to hold a movable carrier supporting a plurality of trays.

8. A tunnel kiln comprising a lower compartment having cooling means and an upper compartment having adjustable supplies of heating, cooling and reactive fluid distributed therein at the central portion and at points intermediate the central portion and each end of the kiln for positively holding the temperature substantially uniform throughout the central portion of highest temperature and for regulating and controlling the temperature and the reaction at each stage of the kiln and producing gradual gradiant of temperature from each end of the kiln to the eentrol portion of highest temperature, means for atomizing water into the exit end of the upper compartment of said kiln and means for regulating the return to the kiln of the gases exiting therefrom.

9. In an apparatus for activating carbon, a tunnel kiln comprising a lower compartment having cooling means and an upper compartment having adjustable supplies of heating, cooling and activating fluid distributed therein at the central portion and at points intermediate the central portion and each end of the kiln for holding the temperature substantially uniform throughout the central portion of highest temperature and for regulating and controlling the temperature and activation at each stage of the kiln and producing progressive heating and cooling zones extending from the ends of the carbon activating zone of highest temperature, means for atomizing water into the exit end of the upper compartment of said kiln and means for regulating the return to the kiln of the gases exiting therefrom, a carrier having a plurality of superimposed trays forming an open-work structure permitting free circulation of activating gas between same, and means comprising a track in said lower compartment and rollers supporting said carrier for effecting smooth travel of said carrier throughout the kiln.

OSCAR L. BARNEBEY.
JOSEPHINE B. CHENEY,
*Administratrix of the Estate of Merritt B. Cheney, Deceased.*